United States Patent Office 3,538,158
Patented Nov. 3, 1970

3,538,158
β-CARBAMYL-β-HYDROXYETHYLAMINES
Bruno Sander and Friedrich Fuchs, Ludwigshafen (Rhine), Friedrich Becke, Heidelberg, and Reinhold Kohlhaupt, Frankenthal, Pfalz, Germany, assignors to Badische Anilin- & Soda-Fabrik Aktiengesellschaft, Ludwigshafen (Rhine), Germany
No Drawing. Filed Oct. 30, 1967, Ser. No. 679,247
Claims priority, application Germany, Nov. 4, 1966, 1,543,378
Int. Cl. C07c *103/10*
U.S. Cl. 260—561    5 Claims

ABSTRACT OF THE DISCLOSURE

New β-carbamyl - β - hydroxyethylamines having the formula:

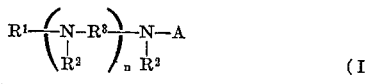    (I)

where A denotes the β-carbamyl-β-hydroxyethyl radical

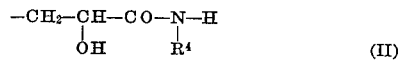    (II)

where $R^4$ denotes hydrogen, or methylol or alkoxymethyl having up to six carbon atoms, $R^1$ (when $n$=zero) denotes hydrogen or hydroxyl or alkylol or

or $R^2$, or for any value of $n$ above zero $R^1$ denotes $R^2$ which denotes A, hydrogen, or alkyl, alkylol or alkoxymethyl having up to six carbon atoms, $R^3$ denotes alkylene having two to twelve carbon atoms and $n$ denotes zero or another integer, the molecule (I) containing at least two radicals A. The compounds (I) are prepared by reaction of a glycidic amide

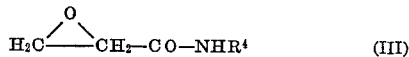    (III)

with an amine

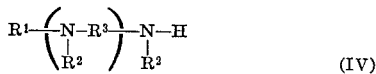    (IV)

in which at least one of the radicals $R^1$ or $R^2$ denotes hydrogen. The new β-carbamyl-β-hydroxyethylamines (I) are strong complex-forming substances for heavy metal ions, particularly iron ions.

---

The present invention relates to novel β-carbamyl-β-hydroxyethylamines having the general formula:

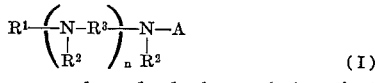    (I)

in which A denotes a β-carbamyl-β-hydroxyethyl radical having the general formula:

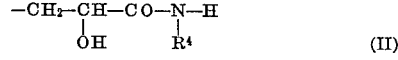    (II)

in which $R^4$ denotes a hydrogen atom, a methylol group or an alkoxymethyl group having up to six carbon atoms, $R^1$ (when $n$ denotes zero) denotes a hydrogen atom, a hydroxyl group, an alkylol group, the radical

or the radical $R^2$ or (when $n$ denotes an integer) denotes the radical $R^2$; $R^2$ denotes the radical A, a hydrogen atom, an alkyl group, an alkylol group or an alkoxymethyl group having up to six carbon atoms; $R^3$ denotes an alkylene group having two to twelve carbon atoms; and $n$ denotes zero or another integer, and the molecule (I) contains at least two radicals A. The invention also relates to a process for the production of the novel β-carbamyl-β-hydroxyethylamines.

The object of this invention is to provide agents for masking heavy metal ions by the formation of complexes in aqueous solution, the said agents having a higher complex-forming power and being more widely applicable than prior art agents used for this purpose.

We have found that this object is achieved by reacting a glycidic amide having the general Formula III:

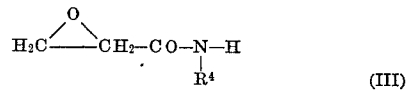    (III)

with an amine having the general formula (IV):

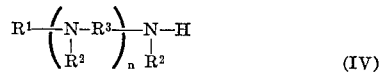    (IV)

in which at least one of the radicals $R^1$ or $R^2$ denotes a hydrogen atom.

The most important starting compound (III) is glycidic amide (with $R^4$ denoting a hydrogen atom); other compounds (III) are N-methylolglycidic amide ($R^4$ denoting $CH_2OH$) and alkyl ethers thereof in accordance with the above definition.

Examples of starting compounds (IV) are ammonia ($R^1=R^2=H$; $n$=zero), hydrazine ($R^1=NH_2$; $n$=zero), N,N-dimethylhydrazine ($R^1=N(CH_3)_2$; $n$=zero, N,N'-dimethylhydrazine ($R^1=NHCH_3$; $R^2=CH_3$; $n$—zero), hydroxylamine ($R^1=OH$; $R^2=H$; $n$=zero), $C_2$–$C_6$ alkylenediamines ($R^1=R^2=H$; $R^3=C_2$–$C_6$ alkylene; $n$= 1), low molecular weight alkylene polyamines ($R^1= R^2=H$; $R^3=C_2$–$C_6$ alkylene; $n$=2 to 5), and polyethyleneimine ($R^1=R^2=H$; $R^3$=ethylene; $n$=more than 5). The compounds (IV) are for the most part known or obtainable by known methods.

The products (I) have better complex-forming properties the greater the ratio of the number of groups A to the number of basic nitrogen atoms and the greater the ratio of the number of nitrogen atoms to the number of carbon atoms in the compound (IV).

The following compounds (I) are therefore particularly preferred which are based on ammonia, hydroxylamine, hydrazine, ethylenediamine, propylenediamine-1,2, propylenediamine - 1,3, ethanolamine, diethylenetriamine, triethylenetetramine and tetraethylenepentamine as the amines (IV):

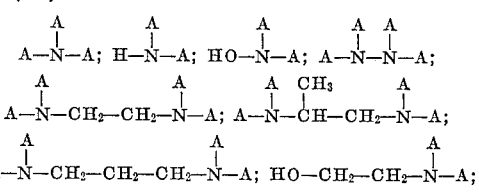

and

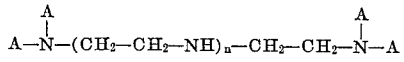

($n$ denoting 1 to 3) and also the reaction products of polyethyleneimine and such an amount of the compound (III) that an average of 10 to 100% of all the active hydrogen atoms on nitrogen atoms are replaced by the radical A.

The compounds (III) and (IV) are reacted with each other by known methods of adding epoxy compounds to amines, and in a molar ratio corresponding to the proportion of A in the molecule of the compound (I) to be prepared.

The method of placing the compound (III) in a reactor in the form of a 10 to 50% aqueous or alcoholic, preferably methanolic, solution and adding the amine (IV)—with or without solvent—at 30° to 80° C. has proved to be very suitable. The end of the reaction (the reaction as a rule lasts for one to five hours) is recognizable by the end of evolution of heat.

If compound (I) is to contain N-methylol groups or N-methylol ether groups, then obviously an equivalent embodiment of the process consists in introducing these groups into the reaction product concerned after the reaction of compound (III) with compound (IV). In this case the radicals $R^1$, $R^2$ and $R^4$ in compounds (III) or (IV) should denote hydrogen atoms at least to an extent corresponding to the desired degree of methylolation or alkoxymethylation. Methylolation and alkoxymethylation may be carried out in a conventional way by reaction of the compounds concerned with formaldehyde or with formaldehyde and an alcohol.

The compounds (I) are strong complex-forming substances for heavy metal ions, and in a very special way for iron(III) ions.

They may therefore be mainly used as masking agents for iron in aqueous solutions and suspensions where the iron would otherwise be troublesome, for example in the paper and textile industries. They are capable of masking the surprisingly large amount of 0.4 to 3.5 grams of $Fe^{+++}$ per gram of solid substance at 20° C. and at pH values of from 2 to 12, while this ability falls off to about 0.1 gram at lower and higher pH values, but remaining in an industrially useful and above all economical range up to pH 1 or pH 13. These values are not achieved at 100° C. but even at this temperature the values are unexpectedly high at about 40 to 95% of the values obtaining at 20° C.

From 0.1 time to twice the weight of masking agent (I) is in general used with reference to the content of $Fe^{+++}$.

Since the agents act quantitatively even in high dilution, the same relationships hold good for the concentrations in aqueous solution, i.e. if the content of iron to be masked is between about 0.0005 and 0.01% (such as is usually the case in practice in the paper and textile industries) the appropriate concentrations of the masking agent are from 0.0002 to 0.02%. In the case of other heavy metals, as for example nickel, cobalt, iron(II), chromium(III) or aluminum, which have a lower affinity to the agents according to this invention than iron(III), the amount and concentration required is higher, usually by about one power of ten. These values hold good when the metals are ionic; if they are present as solid compounds, however, the amount of the complex-forming substance required may have to be raised to concentrations of about 0.1% depending on the particle size.

For analytical purposes it is often necessary to mask relatively large amounts of iron(III) in a concentration of up to about 0.5% so that the detection of other constituents, such as alkaline earth metals, is not disturbed. The products according to this invention will also give good service in this connection.

According to previous observations, the complex-forming action of the compounds (I) rests on the structure:

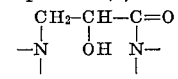

the type of radicals on the nitrogen atoms within the said definitions being of minor importance. Consequently all compounds (I) are useful which contain different substituents $R^1$ or $R^2$ or $R^3$ or $R^4$, such as is possible particularly when $n$ is more than zero and the compounds contain several radicals A. Obviously mixtures of different compounds (I) are also suitable, so that for their preparation the starting amines may advantageously be technical mixtures of amines (IV).

It should also be emphasized that the compounds according to this invention, when used as masking agents, have good compatibility with other agents and that impairment of the effect by the presence of other chemicals, for example oxidizing agents for oxidizing $Fe^{++}$ to $Fe^{+++}$, has not so far been observed and as a rule need not be feared. This insensitivity is of particular advantage, among other things, because it permits successful combination with other masking agents, for example those of the type of ethylenediamine tetraacetate, which respond mainly to alkaline earth metals, or with sorbitol, by which complex-forming ability in the alkaline range is considerably increased.

The invention is illustrated by the following examples.

EXAMPLES 1 TO 17

In each case a mole of an amine (IV) is added to an about 40% aqueous or methanolic solution of m moles of a glycidic amide (III) in the course of one to two hours while cooling at room temperature, the bulk of product (I) crystallizing out. The reaction mixture is worked up by conventional methods; the yield is $y\%$.

In cases where the compound (I) contains N-methylol groups, these groups are introduced into the reaction product of compound (III) ($R^4=H$) and compound (IV) in the conventional manner with p moles of formaldehyde added as an aqueous solution.

Elementary analysis of the compounds (I) corresponds to the calculated values within the limits of error.

The examples are given below in tabular form:

| | III | | | I | | |
|---|---|---|---|---|---|---|
| Ex. | m (mol) | $R^4$ | IV | $A'=-CH_2-CHOH-CO-NH-$ | $y$ (percent) | M.P. (°C.) |
| 1 | 3 | H | $NH_3$ | $N{\begin{smallmatrix}-A'H\\-A'H\\A'H\end{smallmatrix}}$ | 86 | 164. |
| 2 | 3 | $-CH_2OH^1$ | $NH_3$ | $N{\begin{smallmatrix}-A'-CH_2OH\\-A'-CH_2OH\\A'-CH_2OH\end{smallmatrix}}$ | 76 | Oily. |
| 3 | 2 | H | $NH_3$ | $HN{\begin{smallmatrix}-A'-H\\A'-H\end{smallmatrix}}$ | 82 | 193. |
| 4 | 2 | $-CH_2OH^1$ | $NH_3$ | $HN{\begin{smallmatrix}-A'-CH_2OH\\A'-CH_2OH\end{smallmatrix}}$ | 77 | Oily. |
| 5 | 4 | H | $H_2N-CH_2-CH_2-NH_2$ | $\begin{smallmatrix}HA'\\HA'\end{smallmatrix}{>}N-CH_2-CH_2-N{<}\begin{smallmatrix}A'H\\A'H\end{smallmatrix}$ | 92 | 201. |

| Ex. | III m (mol) | R⁴ | IV | I A′=—CH₂—CHOH—CO—NH— | y (percent) | M.P. (°C.) |
|---|---|---|---|---|---|---|
| 6 | 4 | H | H₂N—CH(CH₃)—CH₂—NH₂ | HA′\N—CH(CH₃)—CH₂—N/A′H (HA′/ ... \A′H) | 81 | Oily. |
| 7 | 4 | H | H₂N—(CH₂)₃—NH₂ | HA′\N—(CH₂)₃—N/A′H | 78 | Do. |
| 8 | 4 | —CH₂OH¹ | H₂N—CH₂—CH₂—NH₂ | (HOCH₂A′)₂N—CH₂—CH₂—N(A′CH₂OH)₂ | 84 | Do. |
| 9 | 4 | —CH₂—OCH₃ | H₂N—CH₂—CH₂—NH₂ | (CH₃OCH₂A′)₂N—CH₂—CH₂—N(A′CH₂OCH₃)₂ | 91 | Do. |
| 10 | 4 | H | H₂N—(CH₂)₆—NH₂ | HA′\N—(CH₂)₆—N/A′H | 91 | Do. |
| 11 | 4 | —CH₂OH¹ | H₂N—(CH₂)₆—NH₂ | (HOCH₂A′)₂N—(CH₂)₆—N(A′CH₂OH)₂ | 86 | Do. |
| 12 | 4 | H | H₂N—NH₂ | HA′\N—N/A′H | 94 | Do. |
| 13 | 2 | H | HO—NH₂ | HO—N(A′H)₂ | 80 | Do. |
| 14 | 5 | H | H₂N—(CH₂—CH₂—NH)₂H | HA′\N—(CH₂—CH₂—NA′)₂A′H | 88 | 52. |
| 15 | 6 | H | H₂N—(CH₂—CH₂—NH)₃H | HA′\N—(CH₂—CH₂—NA′)₃A′H | 90 | 48. |
| 16 | ²100 | H | polyethyleneimine | ...(—N(A′H)—CH₂—CH₂)...poly | 95 | 60. |
| 17 | 2 | H | HO—CH₂—CH₂—NH₂ | HO—CH₂—CH₂—N(A′H)₂ | 89 | Oily. |

¹ By introduction of methylol groups into the appropriate compound with R⁴=H.

² Percent; complete substitution of the active hydrogen atoms by A (1 mole of III to 43 g. of polyethyleneimine).

In each case, 100 ml. of an aqueous solution containing 100 mg. of solid substance of the product of some of the examples is titrated at 20° and 100° C. and at different pH values with a 0.01% solution of iron(III) chloride until a precipitate of iron(III) hydroxide begins to form, from which it is possible to calculate how many milligrams of iron(III) can be masked by 100 mg. of the agent concerned. The end point of the titration is established after one to several experiments as that point at which a just detectable precipitate no longer changes (i.e. neither disappears nor increases) after twenty-four hours at 20° C. or after three hours at 100° C. at the pH values in question.

The values obtained are collected in the following table:

100 MG. OF THE PRODUCT OF EACH EXAMPLE MASKED AT T ° C. AND AT pH VALUES 5 TO 13 x (MG.) Fe⁺⁺⁺

| | x(mg.) at T=20° C. and pH | | | | | | | | | x(mg.) at T=100° C. and pH | | | | | | | | |
|---|---|---|---|---|---|---|---|---|---|---|---|---|---|---|---|---|---|---|
| | 5 | 6 | 7 | 8 | 9 | 10 | 11 | 12 | 13 | 5 | 6 | 7 | 8 | 9 | 10 | 11 | 12 | 13 |
| 1 | 320 | 223 | 183 | 105 | 28 | 42 | 24 | 17 | 17 | 175 | 190 | 183 | 105 | 28 | 42 | 24 | 17 | 8 |
| 2 | 182 | 144 | 118 | 49 | 22 | 36 | 24 | 15 | 11 | 81 | 88 | 105 | 48 | 22 | 36 | 15 | 13 | 10 |
| 3 | 189 | 154 | 118 | 42 | 20 | 56 | 70 | 24 | --- | 11 | 27 | 77 | 42 | 20 | 56 | 18 | --- | --- |
| 5 | 288 | 215 | 178 | 152 | 28 | 48 | 28 | 13 | 12 | 42 | 49 | 177 | 152 | 28 | 48 | 28 | 13 | --- |
| 8 | 185 | 147 | 124 | 105 | 33 | 84 | 77 | 42 | 10 | 28 | 28 | 28 | 67 | 20 | 84 | 77 | 7 | 8 |
| 9 | 119 | 98 | 71 | 1 | 8 | 63 | 55 | --- | --- | | | | | | | | | |
| 11 | 84 | 78 | 70 | 1 | 13 | 84 | 75 | 14 | --- | | | | | | | | | |
| 17 | 217 | 182 | 161 | 133 | 36 | 38 | 25 | 22 | 21 | 25 | 82 | 113 | 132 | 31 | 31 | 10 | 17 | 3 |

NOTE.—Leaders indicate not determined.

We claim:
1. A β-carbamyl-β-hydroxyethylamine having the general Formula I:

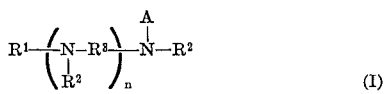

(I)

in which A denotes a β-carbamyl-β-hydroxyethyl radical having the general Formula II:

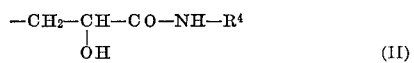

(II)

in which $R^4$ denotes a hydrogen atom, a methylol group or an alkoxymethyl group having up to six carbon atoms, $R^1$, when $n$ denotes zero, denotes a hydrogen atom, a hydroxyl group, hydroxyethyl, the radical

or, when $n$ denotes 1–5, $R^1$ denotes the radical $R^2$, $R^2$ denotes the radical A, a hydrogen atom, an alkyl group, an alkylol group or an alkoxymethyl group respectively having up to six carbon atoms, $R^3$ denotes an alkylene group having two to twelve carbon atoms and $n$ denotes zero or one of the integers 1 through 5, and in which the molecule (I) contains at least two radicals.

2. N,N,N-tris-(β-carbamyl-β-hydroxyethyl)-amine

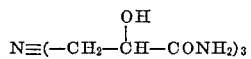

3. N,N,N - tris-(N-methylol-β-carbamyl - β - hydroxyethyl)-amine

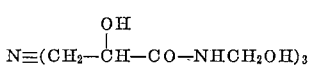

4. N,N,N',N'-tetra-(β - carbamyl - β - hydroxyethyl)-ethylenediamine

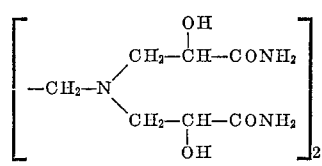

5. N,N,N',N'-tetra-(N - methylol - β - carbamyl-β-hydroxyethyl)-ethylenediamine

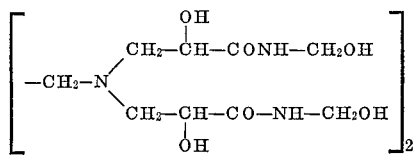

References Cited
UNITED STATES PATENTS

| | | | |
|---|---|---|---|
| 3,424,771 | 1/1969 | Libby et al. | 260—404.5 |
| 3,168,415 | 2/1965 | Goldstein et al. | 117—139.4 |

ALEX MAZEL, Primary Examiner

J. A. NARCAVAGE, Assistant Examiner

U.S. Cl. X.R.

252—405, 408